US008321387B2

(12) United States Patent
Dettinger et al.

(10) Patent No.: US 8,321,387 B2
(45) Date of Patent: Nov. 27, 2012

(54) RESTRICTING ACCESS TO SENSITIVE DATA

(75) Inventors: Richard D. Dettinger, Rochester, MN (US); Janice R. Glowacki, Rochester, MN (US); Daniel P. Kolz, Rochester, MN (US); Padma S. Rao, Rochester, MN (US); Marci L. Sperber, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1754 days.

(21) Appl. No.: 11/191,415

(22) Filed: Jul. 28, 2005

(65) Prior Publication Data

US 2007/0027880 A1      Feb. 1, 2007

(51) Int. Cl.
*G06F 17/30* (2006.01)

(52) U.S. Cl. ...................................................... 707/694

(58) Field of Classification Search .................... None
See application file for complete search history.

(56) References Cited

U.S. PATENT DOCUMENTS

| | | | |
|---|---|---|---|
| 5,261,102 A | 11/1993 | Hoffman | |
| 5,355,474 A | 10/1994 | Thuraisngham et al. | |
| 5,694,590 A | 12/1997 | Thuraisingham et al. | |
| 5,751,949 A | 5/1998 | Thomson et al. | |
| 6,141,754 A | 10/2000 | Choy | |
| 6,226,745 B1 | 5/2001 | Wiederhold | |
| 6,236,996 B1 | 5/2001 | Bapat et al. | |
| 6,487,552 B1 | 11/2002 | Lei et al. | |
| 6,516,315 B1 | 2/2003 | Gupta | |
| 6,578,037 B1 | 6/2003 | Wong et al. | |
| 6,725,227 B1* | 4/2004 | Li | 707/102 |
| 6,745,332 B1 | 6/2004 | Wong et al. | |
| 2002/0010867 A1 | 1/2002 | Schaefer et al. | |
| 2004/0068488 A1* | 4/2004 | Dettinger et al. | 707/3 |
| 2004/0068661 A1* | 4/2004 | Dettinger et al. | 713/200 |
| 2004/0088561 A1* | 5/2004 | Dettinger et al. | 713/200 |

OTHER PUBLICATIONS

Fule et al. "Detecting Privacy and Ethical Sensitiviy in Data Mining Results", 2004, ACM Internation Conference proceeding Series; vol. 56, pp. 159-166.*
U.S. Appl. No. 10/083,075, "Application Portability and Extensibility Through Database Schema and Query Abstraction", filed Feb. 26, 2002.
U.S. Appl. No. 10/284,944, "Method of Query Return Data Analysis for Early Warning Indicators of Possible Security Exposures", filed Oct. 31, 2002.
U.S. Appl. No. 10/264,243, "Intelligent Use of User Data to Preemptively Prevent Execution of Query Violating Access Controls", filed Oct. 3, 2002.

(Continued)

*Primary Examiner* — Yuk Ting Choi
(74) *Attorney, Agent, or Firm* — Patterson & Sheridan LLP

(57) ABSTRACT

Techniques are disclosed for managing execution of queries against databases and more particularly for restricting access to sensitive data in underlying databases. One embodiment includes an operation for managing access to sensitive data in a database. The operation includes receiving, from a requesting entity, a query against the data in the database. The query is executed against the database to obtain a result set. The operation further includes determining whether the result set includes sensitive data based on predefined sensitivity attributes associated with data in the result set. If so, a sensitivity rating is determined for the result set, and a predefined security action is performed with respect to the result set on the basis of the determined sensitivity rating.

16 Claims, 12 Drawing Sheets

OTHER PUBLICATIONS

Browder, Kristy et al., Technical Comparison of Oracle Database vs. IBM DB2 Udb: Focus on Security: An Oracle White Paper, ORACLE, Feb. 2002, Oracle Corporation, Redwood Shores, CA, United States.

Browder, Kristy et al., The Virtual Private Database in Oracle9iR2: Understanding Oracle9i Security for Service Providers: An Oracle Technical White Paper, ORACLE, Jan. 2002, Oracle Corporation, Redwood Shores, CA, United States.

Keefe, T.F. et al., Secure Query-Processing Strategies, Computer, Mar. 1989, pp. 63-70, vol. 22, Issue 3, IEEE Computer Society Press, Los Alamitos, CA, United States.

Null, Linda M. et al., A unified approach for multilevel database security based on inference engines, Proceedings of the twentieth SIGCSE technical symposium on Computer science education, 1989, pp. 108-111, ACM, NY, NY, United States.

Couchman, Jason S., Oracle DBA Certification Exam Guide, 1998, pp. 52-97, McGraw-Hill Companies, Inc., Columbus, OH, United States.

Couchman, Jason S., Oracle DBA Certification Exam Guide, 1998, pp. 100-151, McGraw-Hill Companies, Inc., Columbus, OH, United States.

Couchman, Jason S., Oracle DBA Certification Exam Guide, 1998, pp. 262-314, McGraw-Hill Companies, Inc., Columbus, OH, United States.

Couchman, Jason S., Oracle DBA Certification Exam Guide, 1998, pp. 496-522, McGraw-Hill Companies, Inc., Columbus, OH, United States.

* cited by examiner

RESTRICTING ACCESS TO SENSITIVE DATA

CROSS-RELATED APPLICATIONS

This application is related to the following commonly owned applications: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", U.S. patent application Ser. No. 10/284,944, filed Oct. 31, 2002, entitled "METHOD OF QUERY RETURN DATA ANALYSIS FOR EARLY WARNING INDICATORS OF POSSIBLE SECURITY EXPOSURES" and U.S. patent application Ser. No. 10/264,243, filed Oct. 3, 2002, entitled "INTELLIGENT USE OF USER DATA TO PRE-EMPTIVELY PREVENT EXECUTION OF QUERY VIOLATING ACCESS CONTROLS", which are hereby incorporated herein in their entirety.

BACKGROUND OF THE INVENTION

1. Field of the Invention

The present invention generally relates to data processing and more particularly to methods of restricting access to sensitive data in underlying databases.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One significant issue in the context of databases is security. Databases often contain confidential or otherwise sensitive data which requires some degree of security to be protected from inappropriate and unauthorized access. For example, medical records are considered highly personal and confidential. As such, access to medical records is typically restricted to selected users on the basis of suitable authorization and validation routines. More specifically, suitable validation routines can define which users have access to an underlying database(s) and corresponding authorization routines can define the data which can be accessed in the underlying database(s) by authorized users. However, even though data access to the underlying database(s) can be restricted by a two-fold security mechanism, a user who has access to data could still abuse the data by discriminating access to sensitive data for unauthorized disclosure, fraud, waste, or abuse. In other words, it is possible for users with limited authorization to perform enough consecutive queries to refine result sets to pinpoint particular sensitive information in the underlying database(s).

For instance, assume a medical data warehouse of a medical institution having sensitive data with respect to patients of the institution. Assume further that a given researcher has been validated and authorized to access all data within the medical data warehouse. The researcher executes an initial query against the medical data warehouse in order to retrieve data about a broad array of patients. After receipt of a corresponding initial result set, the researcher analyzes this result set and notices information about a VIP patient therein. The researcher may then revise the initial query so that other likely VIP patients come up within a single subsequent result set. For instance, the researcher revises the initial query by restricting the query on the basis of information which is supposed to be common to some or all VIPs in the medical institution. By way of example, the initial query is restricted with respect to a typical VIP's profession, such as actor, singer or professional football player. Revising the initial query may also include formulating a request for retrieval of information about related individuals, such as siblings, children and/or parents. Although the researcher may have perfectly valid reasons for revising the initial query to select VIP data, it may also be done for misuse.

The foregoing is merely one example of how users may exploit conventional databases. A variety of other subversive techniques may be used to bypass security mechanisms in place to protect data contained in databases.

Therefore, there is a need for improved security mechanisms for databases.

SUMMARY OF THE INVENTION

The present invention generally is directed to a method, system and article of manufacture for managing execution of queries against databases and, more particularly, for restricting access to sensitive data in an underlying database.

One embodiment provides a computer-implemented method of managing access to sensitive data in a database. The method comprises receiving, from a requesting entity, a query against the data in the database and executing the query against the database to obtain a result set. Then, it is determined whether the result set includes sensitive data based on predefined sensitivity attributes associated with data in the result set. If so, a sensitivity rating is determined for the result set, and a predefined security action is performed with respect to the result set on the basis of the determined sensitivity rating.

Another embodiment comprises receiving, from a user, a plurality of queries, each query having one or more result fields, each referencing one or more fields of the database. For each received query of the plurality of queries, an object is updated to reflect the one or more result fields in the received query, whereby the object is dynamically maintained to collectively reflect the fields referenced in the received query as well as the previously received queries from the user. Then, a security rule is applied to the updated object. The security rule defines (i) one or more unauthorized result field combinations for queries from the user and (ii) at least one security action. If the updated object contains a combination of fields that matches an unauthorized result field combination of the applied security rule, the corresponding security action is performed.

Still another embodiment provides a computer-readable medium containing a program which, when executed by a processor, performs operations for managing access to sensitive data in a database. The operations comprise receiving, from a requesting entity, a query against the data in the database, and executing the query against the database to obtain a result set. The operations further comprise determining whether the result set includes sensitive data based on predefined sensitivity attributes associated with data in the result set. If so, a sensitivity rating is determined for the result set, and a predefined security action is performed with respect to the result set on the basis of the determined sensitivity rating.

Yet another embodiment provides a computer-readable medium containing another program which, when executed by a processor, performs operations for managing access to sensitive data in a database. The operations comprise receiving, from a user, a plurality of queries, each query having one or more result fields, each referencing one or more fields of the database. For each received query of the plurality of queries, an object is updated to reflect the one or more result fields in the received query, whereby the object is dynamically maintained to collectively reflect the fields referenced in the received query as well as the previously received queries from the user. Then, a security rule is applied to the updated object, the security rule defining (i) one or more unauthorized result field combinations for queries from the user and (ii) at least one security action. If the updated object contains a combination of fields that matches an unauthorized result field combination of the applied security rule, the corresponding security action is performed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
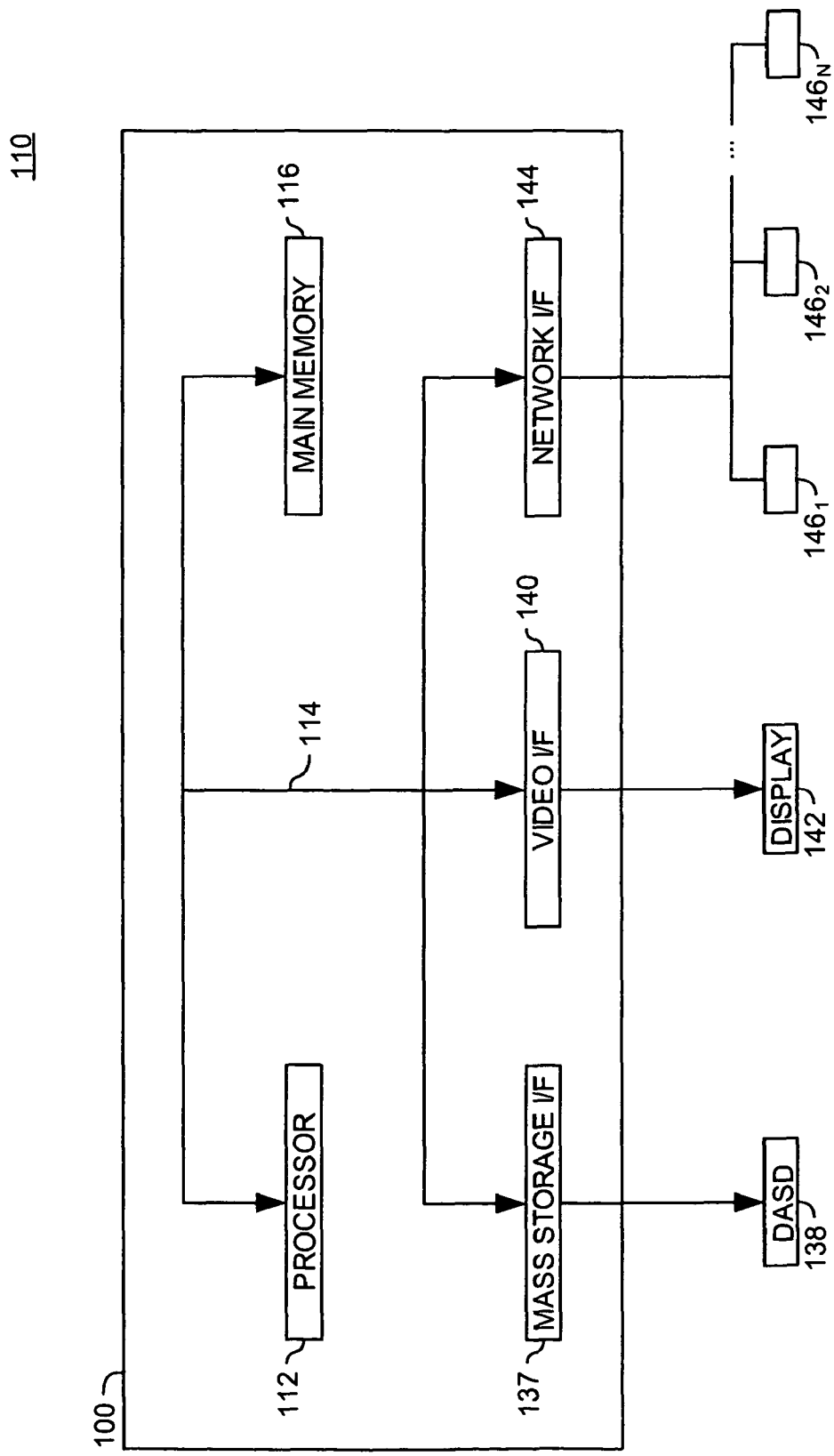
FIG. 1 is one embodiment of a computer system utilized in accordance with the invention.

The present invention is generally directed to a method, system and article of manufacture for managing execution of queries against databases and, more particularly, for restricting access to sensitive data in an underlying database. In general, a query against data in an underlying database is issued by a requesting entity, such as a user, and includes at least one result field. The query is executed against the database to obtain a result set having data for the at least one result field. If the database contains sensitive data which is accessed by the query, the result set may include some or all of the sensitive data.

In one embodiment, the result set is processed prior to outputting it to the requesting entity in order to protect the sensitive data in the database. More specifically, it is determined whether the result set includes some or all of the sensitive data based on predefined sensitivity attributes associated with data included with the result set. If the result set includes sensitive data, a sensitivity rating is determined for the result set and a predefined security action is performed with respect to the result set on the basis of the determined sensitivity rating. By way of example, the predefined security actions may include (i) auditing the requesting entity, (ii) notifying an administrator and (iii) removing the sensitive data from the result set, whereby a modified result set is generated which can then be output to the requesting entity.

In another embodiment, a plurality of queries is received from a user, each query having one or more result fields, each referencing one or more fields of the underlying database(s). In this case, the sensitive data can be protected by processing each received query prior to executing it against the data in the database. More specifically, for each received query of the plurality of queries, an object is updated to reflect the one or more result fields in the received query. The object is dynamically maintained to reflect the collective fields referenced in the received query as well as the previously received queries from the user. Then, a security rule that defines (i) one or more unauthorized result field combinations for queries from the user and (ii) at least one security action is applied to the updated object. If the updated object contains a combination of fields that matches an unauthorized result field combination of the applied security rule, the corresponding security action is performed. By way of example, performing the corresponding security action includes preventing execution of the query if the query contains an unauthorized result field combination.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Creation and Execution Environment

Figure 2:
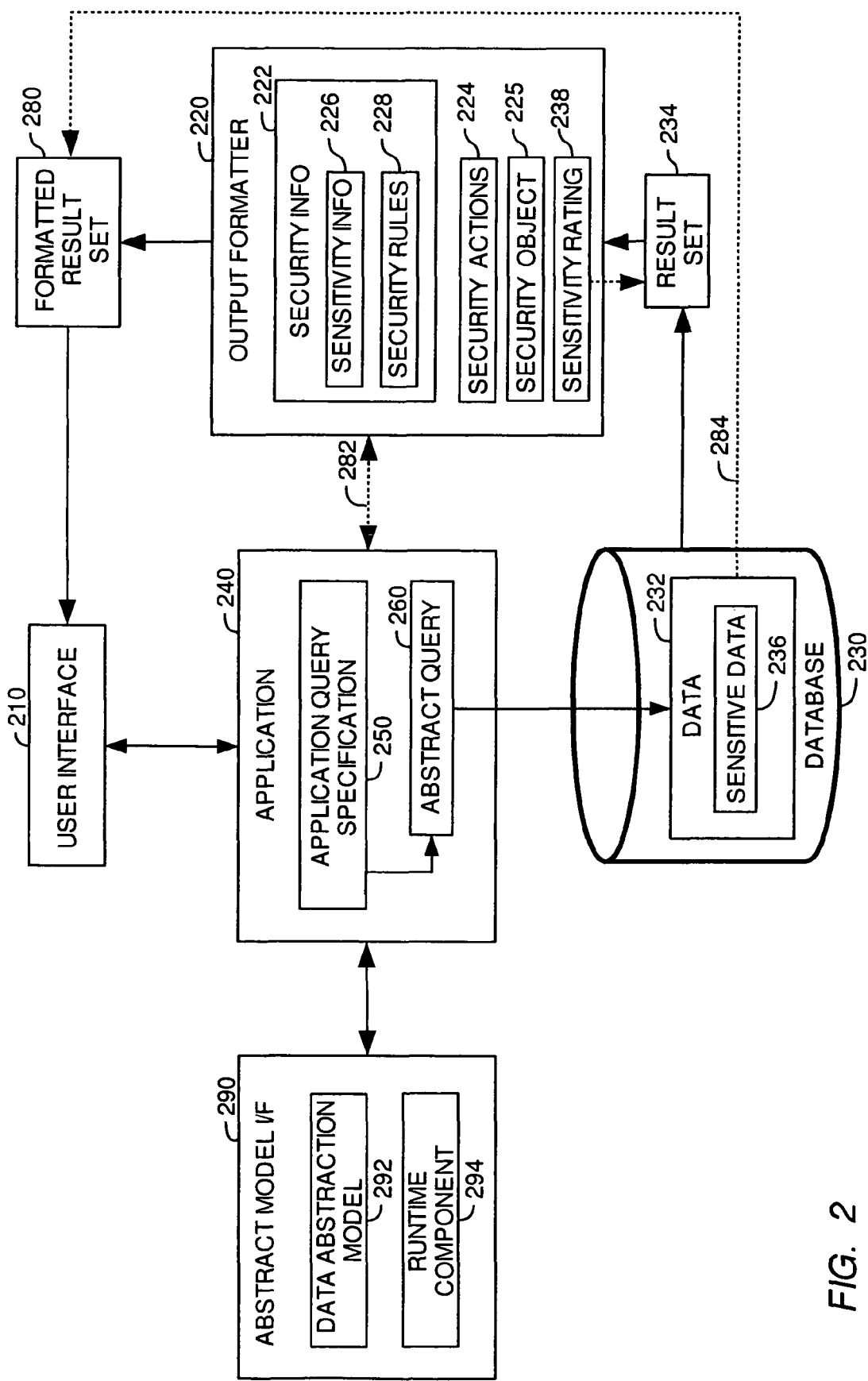
FIG. 2 is a relational view of software components of one embodiment of the invention.

Referring now to FIG. 2, a relational view of software components in one embodiment is illustrated. The software components illustratively include a user interface 210, a database 230, one or more applications 240 (only one application is illustrated for simplicity), an output formatter 230 and an abstract model interface 290.

According to one aspect, the application 240 (and more generally, any requesting entity including, at the highest level, users) issues queries against data 232 in the database 230. The database 230 is shown as a single database for simplicity. However, a given query can be executed against multiple databases which can be distributed relative to one another. Moreover, one or more databases can be distributed to one or more networked devices (e.g., networked devices 146 of FIG. 1). The database 230 is representative of any collection of data regardless of the particular physical representation of the data. A physical representation of data defines an organizational schema of the data. By way of illustration, the database 230 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In general, the queries issued by the application 240 are defined according to an application query specification 250 and may be predefined (i.e., hard coded as part of the application 240) or generated in response to input (e.g., user input). The application query specification(s) 250 is further described below with reference to FIGS. 3-6.

Illustratively, the queries issued by the application 240 are created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 230 (e.g., the application 240, an operating system or an end user). Accordingly, all such implementations are broadly contemplated.

In one embodiment, the queries (referred to herein as "abstract queries") issued by the application 240 are composed using the abstract model interface 290. The abstract model interface 290 is further described below with reference to FIGS. 3-6. The abstract queries are transformed into a form consistent with the physical representation of the data 232 for execution against the database 230. In the illustrated example, an abstract query 260 is created on the basis of logical fields defined by a data abstraction model 292. By way of example, the abstract query 260 is translated by a runtime component 294 into a concrete (i.e., executable) query which is executed against the data 232 of the database 230 to determine a result set 234 for the abstract query 260.

In one embodiment, the result set 234 is processed by the output formatter 220 to protect sensitive data 236 included with the data 232. To this end, the output formatter 220 determines whether the result set 234 contains some or all of the sensitive data 236 on the basis of security information 222. The security information 222 includes sensitivity information 226 and security rules 228. Each of the security rules 228 defines one or more unauthorized result field combinations for queries and indicates one or more associated security actions 224. Use of the security rules 228 is described in more detail below. In one embodiment, the sensitivity information 226 defines sensitivity attributes, such as "SENSITIVE", "CRITICAL", "PASSABLE" and "HARMLESS", for data elements of the data 232, thus defining the sensitive data 236. According to one aspect, the sensitivity information 226 is configured to provide for a column level access constraint, i.e., each field or column of the data 232 in the database 230 has an associated sensitivity attribute. Alternatively, only fields or columns that contain sensitive data may have an associated attribute (i.e., "SENSITIVE" and/or "CRITICAL"). In yet another embodiment, sensitive data is identified by the output formatter 220 according to the fields themselves, rather than a separate attribute. For example, the "Patient ID" field may be designated as sensitive and that designation may be registered with the output formatter 220.

Whatever the particular technique for designating sensitive data is (e.g., attributes or the selected fields themselves), the output formatter 220 determines whether the result set 234 includes some or all of the sensitive data 236. If the result set 234 includes at least a portion of the sensitive data 236, a sensitivity rating 238 is determined for the result set 234. On the basis of the determined sensitivity rating 238, one or more predefined security actions 224 are identified and performed with respect to the result set 234. By way of example, a column of the result set 234 which includes the at least one portion of the sensitive data 236 is removed from the result set 234, whereby a modified result set 280 (hereinafter referred to as the "formatted result set") is generated. The formatted result set 280 is then output to the user interface 210. An exemplary method for processing the result set 234 is described in more detail below with reference to FIGS. 7-9.

In one embodiment, the output formatter 220 parses the abstract query 260 to identify all result fields included therewith and a security object 225 is updated to reflect the identified result fields. The object 225 is dynamically maintained to collectively reflect the fields or columns of the data 232 that are referenced by corresponding result fields in the abstract query 260 as well as in previously received queries from the user.

Then, at least one of the security rules 228 is applied to the updated security object 225. If the updated object 225 contains a combination of fields that matches an unauthorized result field combination defined by the applied security rule(s) 228, the output formatter 220 performs an associated security action(s) 224. According to one aspect, the associated security action(s) 224 is indicated by the applied security rule(s) 228. By way of example, the output formatter 220 may prevent execution of the abstract query 260, as indicated above, if the abstract query 260 includes an unauthorized result field combination. Alternatively, the output formatter 220 may modify the abstract query 260 such that the modified query contains an authorized result field combination. In this case, the output formatter 220 executes the modified abstract query against the database 230 to determine the formatted result set 280 directly, as indicated by a dashed arrow 284. In embodiments in which the result fields of the query are examined, examination may be performed before or after execution of the query. Thus, in one embodiment, the sensitive data 236 included with the data 232 is protected by processing the abstract query 260 prior to execution against the database 230, as illustrated by a dashed arrow 282. In this case, protecting the sensitive data 236 may result in preventing execution of the abstract query 260 against the database 230, thereby economizing processor resources such as processor usage, network bandwidth, DASD load, etc. However, after execution of the abstract query 260, i.e., when the result set 234 has already been determined, protecting the sensitive data 236 may be achieved by preventing output of the result set 234. For purposes of illustration only, reference is made in the following to the case where the output formatter 220 examines the result fields of the abstract query 260 prior to query execution. An exemplary method for processing the abstract query 260 is described in more detail below with reference to FIGS. 10-12.

Logical/Runtime View of Environment

Figure 3:
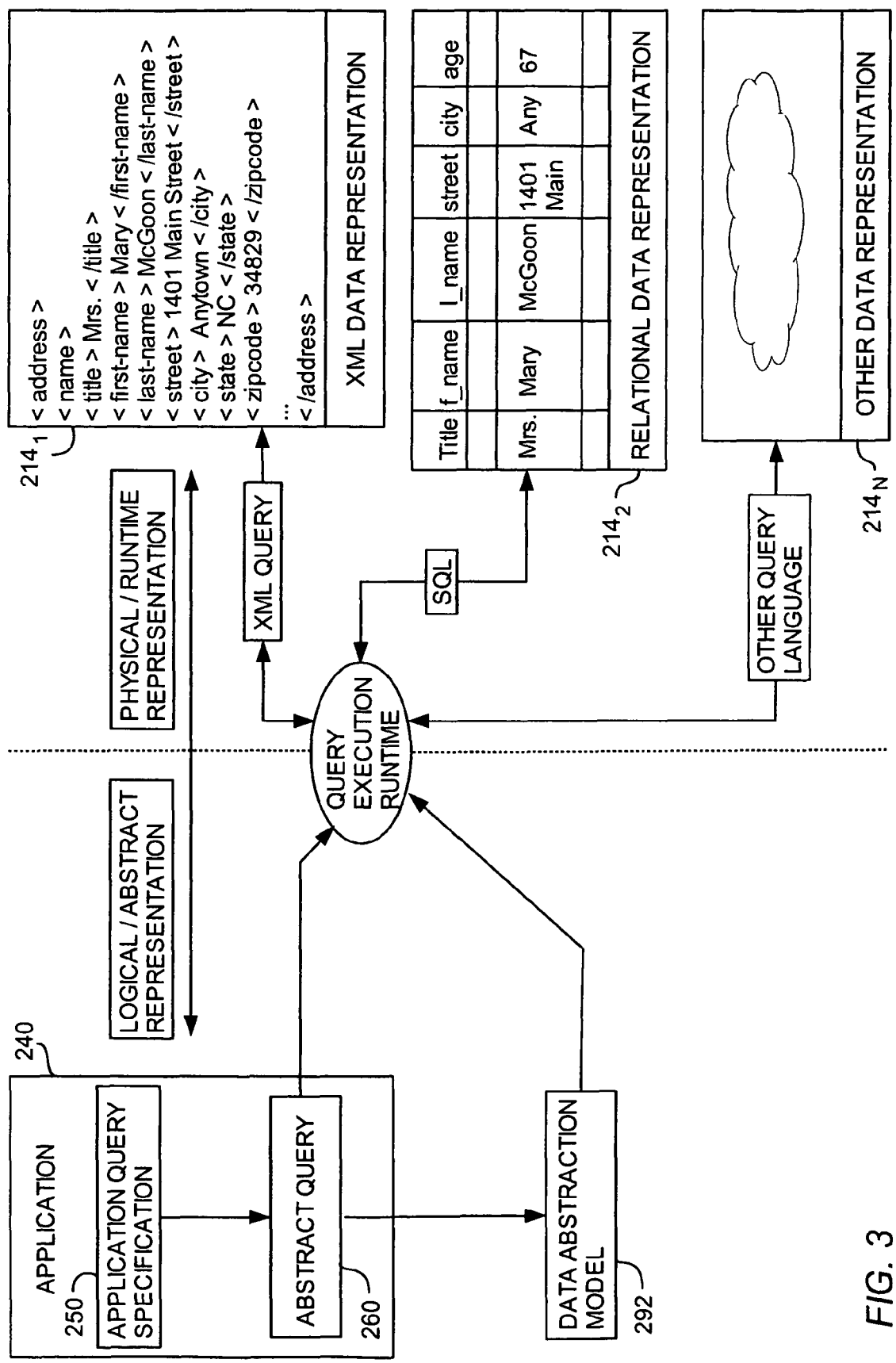
FIGS. 3-4 are relational views of software components in one embodiment.
Figure 4:
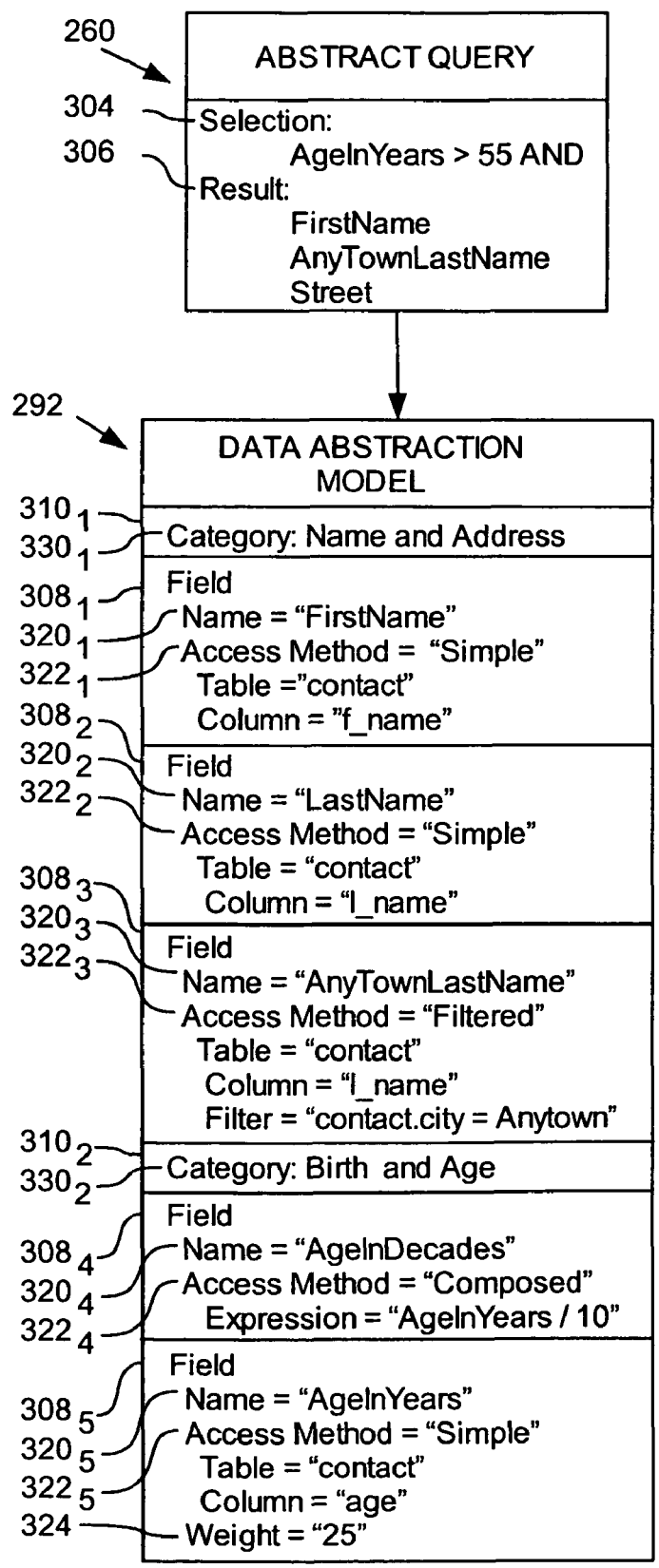

FIGS. 3-4 show an illustrative relational view of the applications 240, the application query specifications 250 and the data abstraction model 292 of FIG. 2 and other components of the invention. A requesting entity (e.g., one of the applications 240 or a user) issues the query 260 as defined by the respective application query specification 250 of the requesting entity. The resulting query 260 is generally referred to herein as an "abstract query" because the query is composed according to abstract (i.e., logical) fields rather than by direct reference to the underlying physical data entities in the database 230 of FIG. 2. As a result, abstract queries may be defined that are independent of the particular underlying data representation used. In one embodiment, the application query specification 250 may include both criteria used for data selection (selection criteria 304) and an explicit specification of the fields to be returned (return data specification 306) based on the selection criteria 304, as illustrated in FIG. 4.

As was noted above, the logical fields specified by the application query specification 250 and used to compose the abstract query 260 are defined by the data abstraction model 292. In general, the data abstraction model 292 exposes information as a set of logical fields that may be used within a query (e.g., the abstract query 260) issued by the application 240 to specify criteria for data selection and specify the form of result data returned from a query operation. The logical fields are defined independently of the underlying data representation being used in a corresponding database (e.g., database 230 of FIG. 2), thereby allowing queries to be formed that are loosely coupled to the underlying data representation.

In one embodiment, illustrated in FIG. 4, the data abstraction model 292 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). The field specification $308_5$ further includes an exemplary weight attribute 324 which indicates a relative importance of this logical field when used as a condition field in a corresponding query condition, as explained in more detail below. Each attribute may have a value. For example, logical field name attribute $320_1$ has the value "FirstName," access method attribute $322_1$ has the value "Simple," and weight attribute 324 has the value "25." Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column." Furthermore, data location metadata "Table" has the value "contact" and data location metadata "Column" has the value "f_name." Accordingly, assuming an underlying relational database schema in the present example, the values of data location metadata "Table" and "Column" point to a table "contact" having a column "f_name."

In one embodiment, groups (i.e. two or more) of logical fields may be part of categories. Accordingly, the data abstraction model 292 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 230 of FIG. 2). As illustrated in FIG. 3, the access methods associate the logical field names to a particular physical data representation $214_1$, $214_2$, . . . $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 292 contains field specifications (with associated access methods) for two or more physical data representations 214. In an alternative embodiment, a different single data abstraction model 292 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 4 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 4 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 4 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 292 shown in FIG. 4 are representative of logical fields mapped to data represented in the relational data representation $214_2$ shown in FIG. 3. However, other instances of the data abstraction model 292 map logical fields to other physical representations, such as XML.

An illustrative abstract query corresponding to the abstract query 260 shown in FIG. 4 is shown in Table I below. By way of illustration, the illustrative abstract query is defined using XML. However, any other language may be used to advantage.

TABLE I

ABSTRACT QUERY EXAMPLE

```
001    <?xml version="1.0"?>
002    <!--Query string representation: (AgeInYears > "55"-->
003    <QueryAbstraction>
004      <Selection>
005        <Condition internalID="4">
006        <Condition field="AgeInYears" operator="GT"
              value="55"
007              internalID="1"/>
008      </Selection>
009      <Results>
010        <Field name="FirstName"/>
011        <Field name="AnyTownLastName"/>
012        <Field name="Street"/>
013      </Results>
014    </QueryAbstraction>
```

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what the field is being compared to). In one embodiment, result specification is a list of abstract fields that are to be returned as a result of query execution. A result specification in the abstract query may consist of a field name and sort criteria.

An illustrative data abstraction model (DAM) corresponding to the data action model 292 shown in FIG. 4 is shown in Table II below. By way of ration, the illustrative Data Abstraction Model is defined using XML. However, any other language may be used to advantage.

By way of example, note that lines 004-008 correspond to the first field specification 308$_1$ of the DAM 292 shown in FIG. 4 and lines 009-013 correspond to the second field specification 308$_2$.

As was noted above, the abstract query of Table I can be transformed into a concrete query for query execution. An exemplary method for transforming an abstract query into a concrete query is described below with reference to FIGS. 5-6.

Transforming an Abstract Query into a Concrete Query

Figure 5:
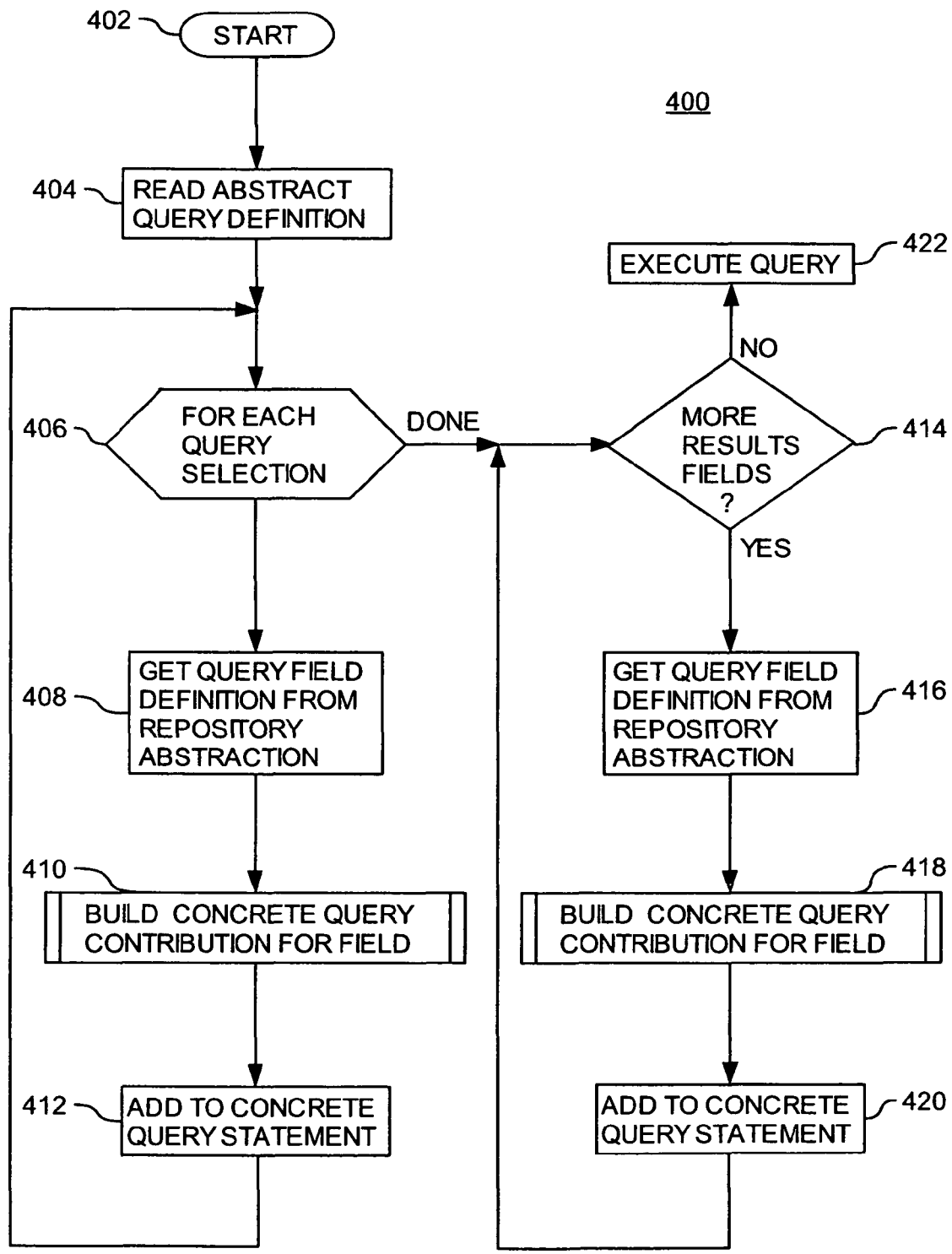
FIGS. 5-6 are flow charts illustrating the operation of a runtime component.

Referring now to FIG. 5, an illustrative runtime method 400 exemplifying one embodiment of the operation of the runtime component 294 of FIG. 2 is shown. The method 400 is entered at step 402 when the runtime component 294 receives as input an abstract query (such as the abstract query shown in Table I). At step 404, the runtime component 294 reads and parses the abstract query and locates individual selection criteria and desired result fields. At step 406, the runtime component 294 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 294 uses the field name from a selection criterion of the abstract query to look up the definition of the field in the data abstraction model 292. As noted above, the field definition includes a definition of the access method used to access the data structure associated with the field. The

TABLE II

DATA ABSTRACTION MODEL EXAMPLE

```
001    <?xml version="1.0"?>
002    <DataAbstraction>
003      <Category name="Name and Address">
004        <Field queryable="Yes" name="FirstName" displayable="Yes">
005          <AccessMethod>
006            <Simple columnName="f_name" tableName="contact"></Simple>
007          </AccessMethod>
008        </Field>
009        <Field queryable="Yes" name="LastName" displayable="Yes">
010          <AccessMethod>
011            <Simple columnName="l_name" tableName="contact"></Simple>
012          </AccessMethod>
013        </Field>
014        <Field queryable="Yes" name="AnyTownLastName" displayable="Yes">
015          <AccessMethod>
016            <Filter columnName="l_name" tableName="contact"
017               "contact.city=Anytown"> </Filter>
018          </AccessMethod>
019        </Field>
020      </Category>
021      <Category name="Birth and Age">
022        <Field queryable="Yes" name="AgeInDecades" displayable="Yes">
023          <AccessMethod>
024            <Composed columnName="age" tableName="contact"
025               Expression="columnName/10"> </Composed>
026          </AccessMethod>
027        </Field>
028        <Field queryable="Yes" name="AgeInYears" displayable="Yes">
029          <AccessMethod>
030            <Simple columnName="age" tableName="contact"></Simple>
031          </AccessMethod>
032        </Field>
033      </Category>
034    </DataAbstraction>
``` runtime component 294 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 230 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 294 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 294 looks up a result field name (from the result specification of the abstract query) in the data abstraction model 292 and then retrieves a result field definition from the data abstraction model 292 to identify the physical location of data to be returned for the current logical result field. The runtime component 294 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 6:
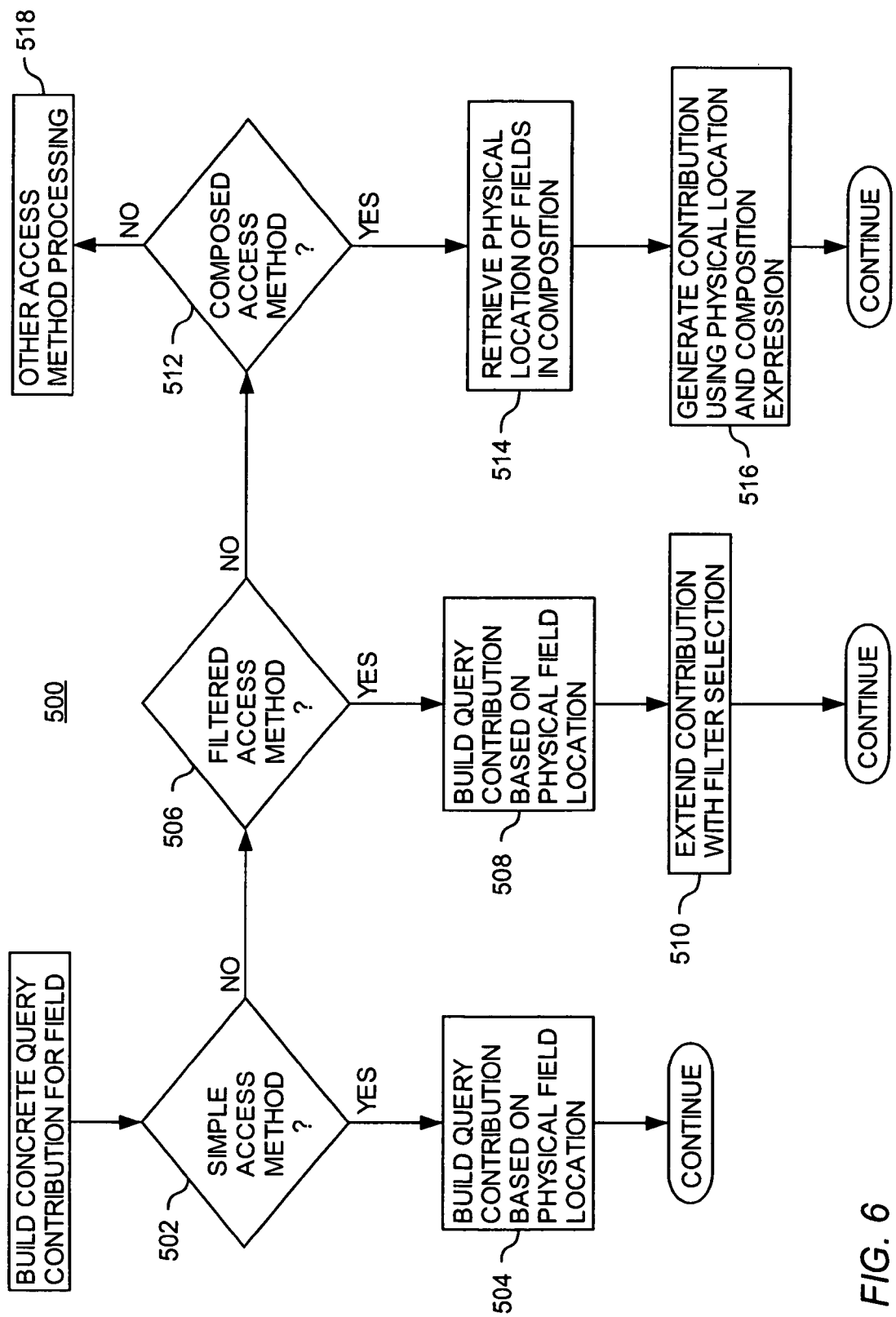

One embodiment of a method 500 for building a concrete query contribution for a logical field according to steps 410 and 418 is described with reference to FIG. 6. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Processing a Result Set to Protect Sensitive Data

Figure 7:
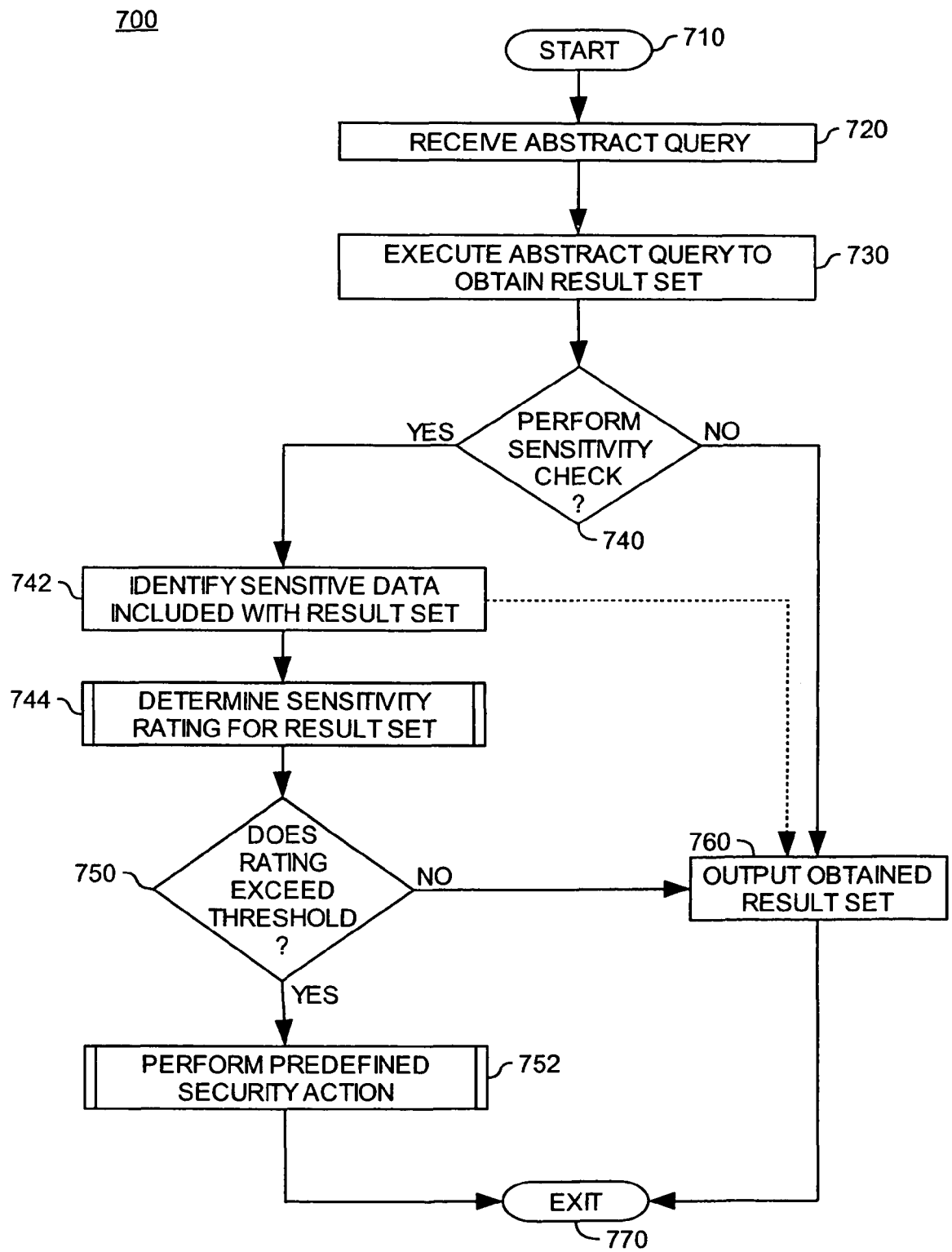
FIG. 7 is a flow chart illustrating a method of restricting access to sensitive data in one embodiment.

Referring now to FIG. 7, one embodiment of a method 700 for processing a result set (e.g., result set 234 of FIG. 2) in order to protect sensitive data (e.g., sensitive data 236 of FIG. 2) in a database (e.g., database 230 of FIG. 2) is illustrated. In one embodiment, at least part of the steps of the method 700 are performed by the output formatter 220 of FIG. 2. Furthermore, at least several steps of the method 700 can be performed on the basis of user input received via the user interface 210 of FIG. 2. Method 700 starts at step 710.

At step 720, an abstract query (e.g., abstract query 260 of FIG. 2) is received from a requesting entity (e.g., application 240 of FIG. 2 or a user). By way of example, the following steps of the method 700 are described with reference to an abstract query issued by a user using the user interface 210 of FIG. 2.

At step 730, the received abstract query is executed against the underlying database, whereby the result set is generated. Then, at step 740 it is determined whether a sensitivity check should be performed. The sensitivity check is configured to determine whether the result set includes sensitive data. In one embodiment, suitable database settings may define that a sensitivity check is required to protect the sensitive data.

If it is determined at step 740 that a sensitivity check is not required, the result set is output to the user at step 760. Method 700 then exits at step 770. If, however, a sensitivity check is required, processing continues at step 742.

At step 742, the result set is analyzed to identify the sensitive data included therein. For instance, assume that the result set contains a plurality of data records, each having data with respect to a patient of a medical institution. In this case, the output formatter may maintain a list of patient IDs identifying all data records having sensitive data. Accordingly, using the list of patient IDs, the sensitive data included with the result set can be identified. If the result set does not include sensitive data, processing may continue at step 760, as indicated by a dashed arrow. If, however, the result set includes sensitive data, a sensitivity rating is determined for the result set at step 744. The sensitivity rating defines a degree of sensitivity of the data included with the result set.

In one embodiment, different types of sensitivity ratings can be determined for distinct result sets. Exemplary types of ratings are quantity ratings, ratio ratings and type ratings, which are described in more detail below with reference to FIG. 8. The type of the sensitivity rating which needs to be determined for a given result set can be defined by an administrator of the underlying database or by a user who created the data in the underlying database. Furthermore, the rating type can be dependent on the sensitive data itself. Specifically, the rating type can be dependent on the type of the sensitive data. For instance, assume that a given type of query issued against a database having a logical field called "CAREER" leads to result sets which include data records that refer to a profession "Professional Actress". Assume further that these data records as such are not considered to be sensitive, but that users should be prevented from collecting too much information about professional actresses. In this case, determination of a ratio rating can be useful in order to prevent display of a given result set if more than 50% of all data records included therewith refer to the "Professional Actress" profession. Assume now that another type of query issued against the "CAREER" field leads to results set which include data records that refer to a profession "Governor". Assume further that these data records are considered to be highly sensitive and that the users should be prevented from gathering any information about governors. In this case, determination of a quantity rating can be useful in order to prevent display of a given result set if one or more data records included therewith refers to the "Governor" profession. An exemplary method for determining a sensitivity rating for the result set which has been generated at step 730 is described in more detail below with reference to FIG. 8.

Then, at step 750, it is determined whether the determined sensitivity rating exceeds a predefined threshold. By way of example, the predefined threshold can be defined by an administrator of the underlying database or by a user who created the data in the underlying database. If the predefined threshold is not exceeded, processing continues at step 760, where the result set is output to the user. For instance, the threshold can be set to "PASSABLE" to prevent output of result sets having "SENSITIVE" and/or "CRITICAL" data. Accordingly, result sets which only have an associated sensitivity rating indicating that the data included therein is "PASSABLE" and/or "HARMLESS" can be output without further action. If, however, the sensitivity rating exceeds the threshold, a predefined security action (e.g., security action(s) 224 of FIG. 2) is performed at step 752. The predefined security action(s) is configured to protect the sensitive data included with the result set.

It should be noted that determining the sensitivity rating and providing the predefined threshold can be considered as optional. In other words, instead of comparing the sensitivity rating to the predefined threshold, the predefined security action(s) can be performed automatically if the result set includes data which is classified as "SENSITIVE" and/or "CRITICAL". Accordingly, all such different implementations are broadly contemplated.

In one embodiment, the security action(s) that needs to be performed at step 752 depends on the determined sensitivity rating. For instance, if the result set includes data which is classified as "SENSITIVE", output of the result set is prevented, while data which is classified "CRITICAL" is simply removed from the result set prior to outputting. Alternatively, a particular security action can be performed each time the predefined threshold is exceeded. For instance, if the result set includes any type of sensitive data, outputting thereof is prevented. An exemplary method for performing the predefined security action(s) is described in more detail below with reference to FIG. 9. Method 700 then exits at step 770.

Figure 8:
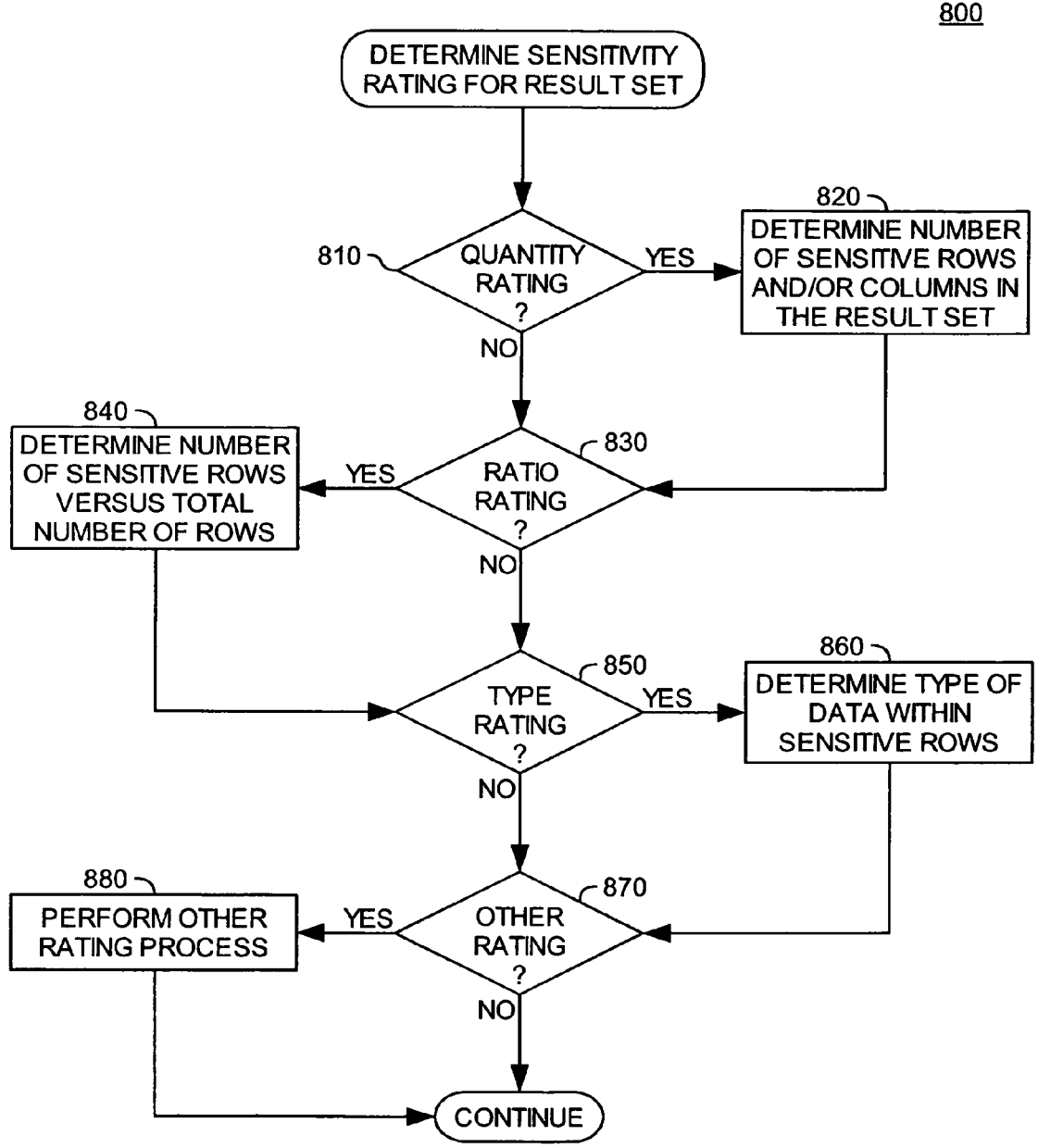
FIG. 8 is a flow chart illustrating a method of determining a sensitivity rating in one embodiment.

Referring now to FIG. 8, an exemplary method 800 for determination of a sensitivity rating (e.g., sensitivity rating 238 of FIG. 2) for a given result set (e.g., result set 234 of FIG. 2) is illustrated. According to one aspect, method 800 is entered from step 744 of FIG. 7. At least a portion of the steps of method 800 is performed using the output formatter 220 of FIG. 2.

Method 800 starts at step 810, where it is determined whether the sensitivity rating is to be determined on the basis of a quantity of sensitive data included with the result set. If the rating is not determined on the basis of the quantity of sensitive data, processing proceeds from step 810 to step 830.

Otherwise, a number of sensitive data elements included with the result set is determined at step 820 and processing then continues at step 830. For instance, if the result set is in tabular form having a plurality of rows and columns, each row and/or column having sensitive data can be counted to define the quantity rating. In this case, the threshold described with respect to step 750 of FIG. 7 can be based on a maximum allowed number of rows and/or columns in the result set.

It should be noted that the determination at step 820, as well as in step 840 described below, can be performed with a predefined granularity with respect to suitable sensitivity attributes defined in corresponding sensitivity information (e.g., sensitivity information 226 of FIG. 2). By way of example, only "SENSITIVE" data elements or "SENSITIVE" and "CRITICAL" data elements can be identified at step 820.

At step 830, it is determined whether the sensitivity rating is to be determined on the basis of a ratio of sensitive data elements versus non-sensitive data elements included with the result set. If the rating is not determined on the basis of the ratio, processing proceeds from step 830 to step 850. Otherwise, a number of sensitive data elements and a number of non-sensitive data elements included with the result set are determined at step 840 and processing then continues at step 850. For instance, in the result set in tabular form each row and/or column having sensitive data and each row and/or column having non-sensitive data can be counted. Using the sensitive data count and the non-sensitive data count, the ratio of both can be determined as the ratio rating. In this case, the threshold described with respect to step 750 of FIG. 7 can be based on a maximum allowed ratio in the result set.

At step 850, it is determined whether the sensitivity rating is to be determined on the basis of a type of sensitive data included with the result set. If the rating is not determined on the basis of the type of sensitive data, processing proceeds from step 850 to step 870. Otherwise, the type of each sensitive data element included with the result set is determined at step 860 and processing then continues at step 870. For instance, the result set in tabular form may have a first subset of rows and/or columns having a first degree of sensitivity and a second subset of rows and/or columns having a second degree of sensitivity. By way of example, assume that the result set includes 100 rows, 99 of which contain "PASSABLE" data and 1 of which contains "SENSITIVE" data. According to one aspect, the type rating is determined by the degree of sensitivity of the data element having the highest sensitivity degree, i.e., in the given example by the "SENSITIVE" degree. In other words, in the given example the sensitivity rating is determined as "SENSITIVE", even if only 1 row is classified as "SENSITIVE". In this case, the threshold described with respect to step 750 of FIG. 7 can be based on a maximum allowed sensitivity type in the result set.

However, it should be noted that the invention is not limited to any of the above described sensitivity ratings. Instead, any possible rating is broadly contemplated. Accordingly, at step 870 it is determined whether the sensitivity rating is to be determined on any other basis. If the rating is not determined on any other basis, processing continues at step 750 of FIG. 7, as described above. Otherwise, the sensitivity rating is determined on another basis at step 880, before processing continues at step 750 of FIG. 7. Furthermore, it should be noted that a sensitivity rating can be determined using more than one of the above described techniques. For instance, the sensitivity rating can be determined with respect to a ratio of sensitive data elements versus non-sensitive data elements included with the result set under consideration of a degree of sensitivity determined for the sensitive data elements. All such implementations are broadly contemplated.

Figure 9:
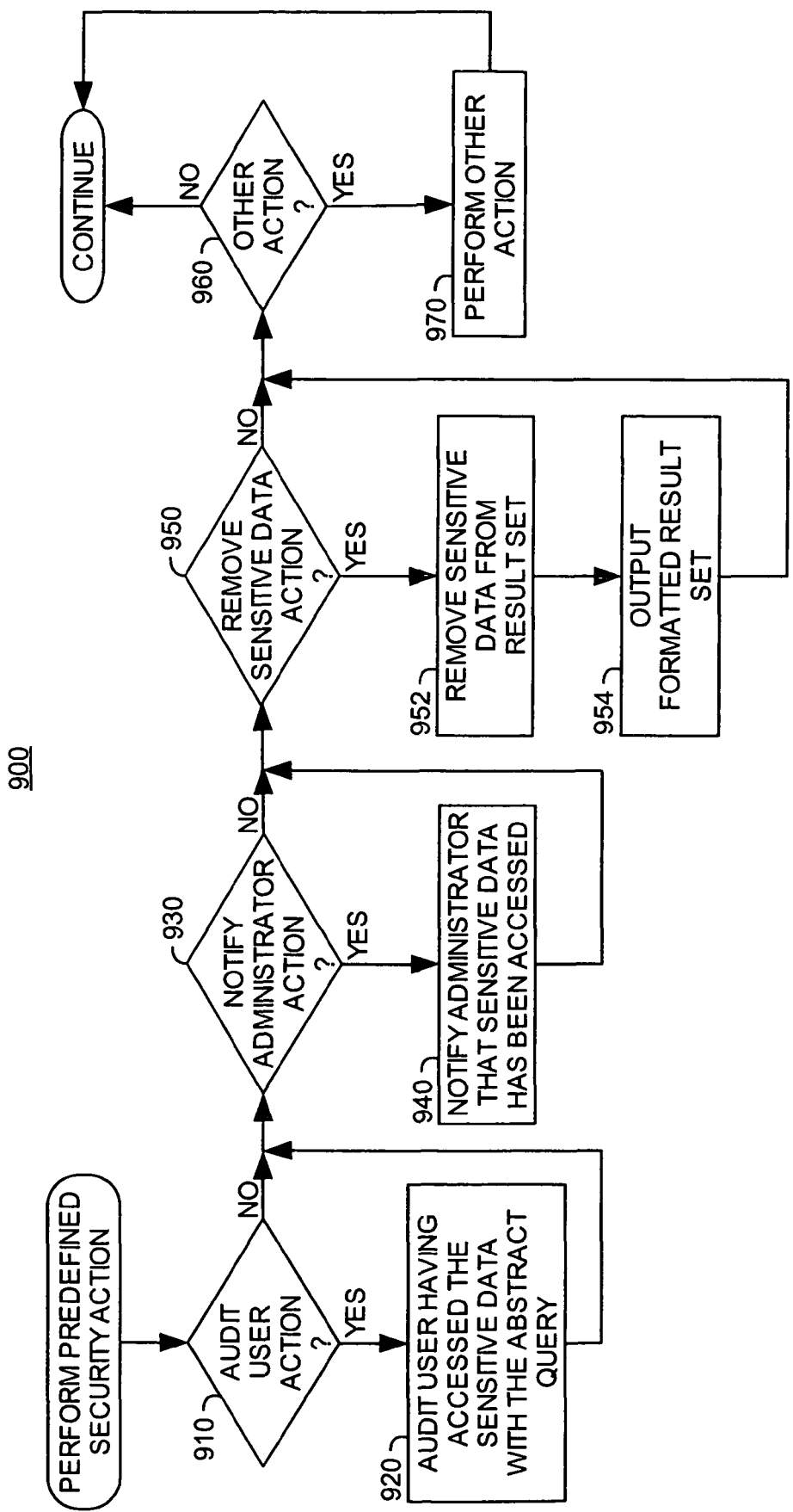
FIG. 9 is a flow chart illustrating a method of performing a predefined security action in one embodiment.

Referring now to FIG. 9, an exemplary method 900 for performing a predefined security action (e.g., security action 224 of FIG. 2) with respect to a given result set (e.g., result set 234 of FIG. 2) having sensitive data is illustrated. According to one aspect, method 900 is entered from step 752 of FIG. 7. At least a portion of the steps of method 900 is performed using the output formatter 220 of FIG. 2.

Method 900 starts at step 910, where it is determined whether the user having issued the abstract query (e.g., abstract query 260 of FIG. 2) underlying the given result set should be audited. If the user should not be audited, processing proceeds from step 910 to step 930. Otherwise, the user is audited at step 920 and processing then continues at step 930. For instance, assume that the user has issued an initial query resulting in an initial result set. Assume further that the user has refined the initial query, whereby the given result set with the sensitive data has been obtained. In this case, the user can be asked to explain the need for the refinement of the initial query in order to determine whether the user actually requires the given result set and the sensitive data.

At step 930, it is determined whether a corresponding administrator should be notified that the result set contains the sensitive data. By way of example, notifying the administrator includes notifying (i) an administrator who administrates the underlying database, (ii) a manager of a corresponding company maintaining the database, and (iii) a supervisor of the user who issued the abstract query underlying the given result set. If the administrator should not be notified, processing proceeds from step 930 to step 950. Otherwise, the administrator is notified at step 940 and processing then continues at step 950. By way of example, the administrator can be notified in cases where the user who issued the underlying abstract query has created a series of queries in order to obtain the given result set with the sensitive data or where the user has already been audited in similar cases before.

At step 950, it is determined whether the sensitive data should be removed from the given result set. If the sensitive data should not be removed, processing proceeds from step 950 to step 960. Otherwise, the sensitive data is removed from the given result set at step 952, whereby a formatted result set (e.g., formatted result set 280 of FIG. 2) is generated. For instance, assume that in the example described above the result set in tabular form contains a single row having the sensitive data. In this case, the single row is removed from the result set to generate the formatted result set. The formatted result set is then output to the user at step 954 and processing then continues at step 960.

However, it should be noted that the invention is not limited to any of the above described security actions. Instead, any possible security action is broadly contemplated. Accordingly, if it is determined at step 960 that any other possible security action(s) should be performed, processing proceeds from step 960 to step 970. After performance of step 970 or if it is determined at step 960 that no other security action(s) should be performed, processing continues at step 770 of the method 700 of FIG. 7, as described above.

Step 970 is representative of any other security actions contemplated as embodiments of the present invention. However, it should be understood that embodiments are contemplated in which less than all the available security actions are implemented. For example, in a particular embodiment only administrator notification actions are used. In another embodiment, only user audit actions and administrator notification actions are used. Furthermore, it should be noted that embodiments are contemplated in which more than one security action is performed with respect to the given result set. For instance, the user may be audited before notification of the administrator and removal of the sensitive data from the given result set. Accordingly, all such implementations are broadly contemplated.

Processing an Abstract Query to Protect Sensitive Data

Figure 10:
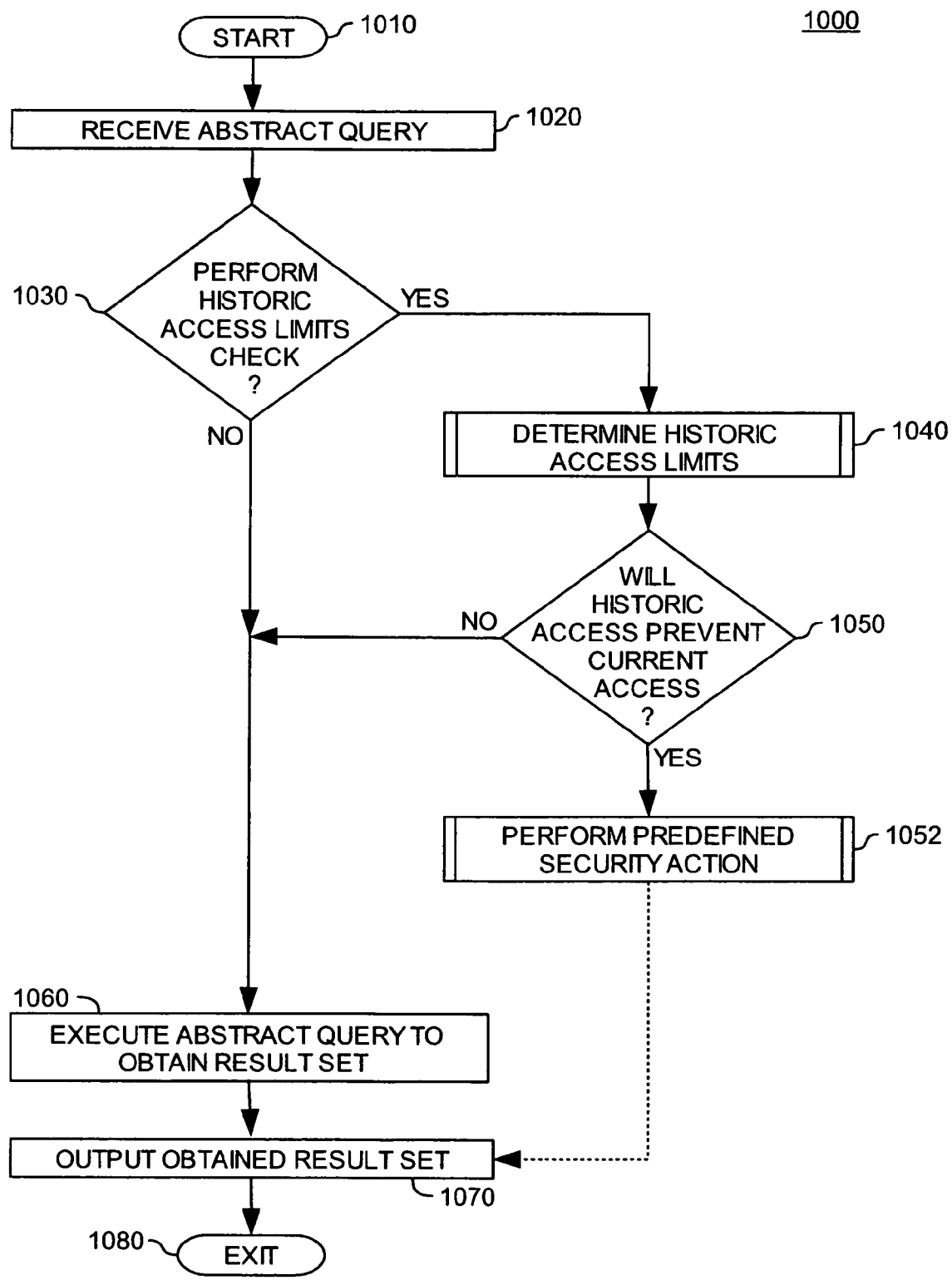
FIG. 10 is a flow chart illustrating a method of restricting access to sensitive data in another embodiment.

Referring now to FIG. 10, one embodiment of a method 1000 for processing an abstract query (e.g., abstract query 260 of FIG. 2) in order to protect sensitive data (e.g., sensitive data 236 of FIG. 2) in a database (e.g., database 230 of FIG. 2) is illustrated. In one embodiment, at least part of the steps of the method 1000 are performed by the output formatter 220 of FIG. 2. Furthermore, at least several steps of the method 1000 can be performed on the basis of user input received via the user interface 210 of FIG. 2. Method 1000 starts at step 1010.

At step 1020, the abstract query is received from a requesting entity (e.g., application 240 of FIG. 2 or a user). By way of example, the following steps of the method 1000 are described with reference to an abstract query issued by a user using the user interface 210 of FIG. 2.

At step 1030, it is determined whether a historic access limits check is required. The historic access limits check is configured to determine a query behavior of the user. More specifically, it is determined which fields in corresponding database tables and/or which database tables have been accessed by the user with the abstract query and previously issued queries. On the basis of the accessed fields and/or tables, it can be determined which result field combinations are authorized for the user in the current abstract query. In other words, the previously accessed fields and/or tables define historic access limits for the user.

In one embodiment, corresponding database settings may define that for specific users a historic access limits check is always required to protect the sensitive data in the database. Furthermore, the historic access limits check can be required for users who are issuing a series of potentially refined queries against the database. On the other hand, for other users or queries which are not potentially refined, a historic access limits check may not be required.

If it is determined at step 1030 that a historic access limits check is not required, the received abstract query is executed against the underlying database at step 1060, whereby a corresponding result set (e.g., result set 234 of FIG. 2) is generated. The result set is output to the user at step 1070. Method 1000 then exits at step 1080.

If, however, it is determined at step 1030 that a historic access limits check is required, processing continues at step 1040. At step 1040, the historic access limits are determined for the user. To this end, in one embodiment a security object (e.g., security object 225 of FIG. 2) associated with the user is updated to reflect all result fields in the current abstract query. The object is dynamically maintained to collectively reflect the fields or tables in the database which are referenced by the result field(s) in the current abstract query as well as in previously received queries from the user. Processing then continues at step 1050. An exemplary method for determining historic access limits is described in more detail below with reference to FIG. 11.

At step 1050, it is determined whether the determined historic access limits of the user will prevent the current access to the database, i.e., access to the database via the given abstract query. To this end, one or more security rules are applied to the security object that is associated with the user.

Each security rule defines (i) one or more unauthorized result field combinations for queries from the user and (ii) at least one security action. Thus, using the security object, it is determined on the basis of the applied security rule(s) whether the current abstract query includes an unauthorized result field combination which requires execution of a suitable security action(s).

For instance, assume a medical institution having a database table with LastName, CurrentCity, Zip, State, Country, AreaCode, Alive, Age, and Race data fields that contain patient information. In one embodiment, a given security rule can be defined that allows only output of information contained in three of these data fields to a given user such that output of too much information about patients is prevented. Assume now that the given user issues an initial query having four result fields: LastName, CurrentCity, Country and Alive. However, as only a maximum of three result fields is allowed, the result field combination in the additional query is not authorized. A corresponding exemplary security rule is shown in Table III below, which is defined using XML. However, any other language may be used to advantage.

TABLE III

SECURITY RULE EXAMPLE

| | |
|---|---|
| 001 | <rule action=hide> |
| 002 | <condition> |
| 003 | <fields set = LastName, CurrentCity, Zip, State, Country, AreaCode, Alive > |
| 004 | <max=3> |
| 005 | </condition> |
| 006 | </rule> |

Illustratively, the exemplary security rule shown in Table III is designed to allow access to a maximum of three data fields ("max=3" in line 004) of the fields LastName, CurrentCity, Zip, State, Country, AreaCode, and Alive (line 003) in the database table. Furthermore, the exemplary security rule defines in line 001 a security action ("action=hide") that is performed if a query includes more than three result fields. By way of example, the security action consists in showing in a corresponding result set only information related to three data fields in the database table, whereby all information related to other data fields is hidden to the user.

Assume now that the given user is trying to find data relating to patients known to have AIDS. To this end, the given user performs a series of consecutive queries to retrieve personal information of these patients for valid evaluation. By way of example, the given user issues an initial query having three result fields: LastName, Country and Alive to obtain personal information with respect to the AIDS patients. All fields in the database which correspond to these result fields are inserted into the security object associated with the given user. Assume now that the user issues an additional query having as result fields: LastName, CurrentCity, and Race in order to find AIDS patients who lived in Africa and have since moved to America. Assume now that the given user should be prevented from knowing exactly where the AIDS patients currently live. Accordingly, execution of the additional query as issued must be prevented. In this case, as the user previously requested information with respect to the LastName, Country and Alive data fields, a security rule is required which does not allow the result field combination in the additional query.

Assume now that another user who needs to retrieve information on patients having AIDS issues a first query having as result fields Age, Race, and CurrentCity. Assume further that this user issues an additional query to ascertain if several of the patients previously lived in Africa. Again, the additional query should be prevented in order to disable the users attempt to gather too much information with respect to the AIDS patients. An exemplary security rule which allows to implement the above described security schema is shown in Table IV below, which is defined using XML and natural language, for simplicity. However, any other language may be used to advantage.

TABLE IV

SECURITY RULE EXAMPLE

| | |
|---|---|
| 001 | <rule action=abort> |
| 002 | <condition> |
| 003 | <fields |
| 004 | set1 = TESTX |
| 005 | set 2 = LastName, Age, Race |
| 006 | set 3 = All Location History fields |
| 007 | set 4 = Current location fields> |
| 008 | <max set1=*ANY set2=*ANY set3=*ANY set4=Country> |
| 009 | <max set1=*ANY set2=*ANY set3=0 set4=*ANY> |
| 010 | </condition> |
| 011 | </rule> |

Illustratively, the exemplary security rule shown in Table IV is designed to allow only access to a Country data field describing a country of current residence ("set4=Country" in line 008 in combination with line 007), if the abstract query or a previously issued query requested previous residence information ("set3=*ANY" in line 008 in combination with line 006). In other words, the user cannot determine the precise current location of residence of an AIDS patient if he is aware of the patient's previous location information. Similarly, access to previous residence information is prevented ("set3=0" in line 009 in combination with line 006), if the abstract query or a previously issued query requested current residence information ("set4=*ANY" in line 009 in combination with line 007). In other words, the user cannot determine the precise previous location of residence of an AIDS patient if he is aware of the patient's current location information. Furthermore, the exemplary security rule of Table IV defines in line 001 a security action ("action=abort") that is performed if a query does not satisfy the security rule. By way of example, the security action consists in preventing execution of the query against the underlying database. Accordingly, using the exemplary security rule of Table IV, each user can access required data without having the ability to gather too much information about any particular patient.

It should be noted that security rules can be determined for different levels of data protection. By way of example, security rules can be created for column level access constraint in order to manage access to sensitive data in an underlying database with respect to columns of corresponding database tables. Furthermore, security rules can be created for table level access constraint in order to manage access to sensitive data in an underlying database with respect to complete database tables. All such implementations are broadly contemplated.

At step 1052, the required security action (e.g., security action(s) 224 of FIG. 2) is performed. An exemplary method for performing the predefined security action(s) is described in more detail below with reference to FIG. 12. If the security action consists in hiding some of the data included with the result set, processing may continue at step 1070 as described above. If execution of the abstract query is prevented, the method 1000 exits at step 1080, as described above.

Figure 11:
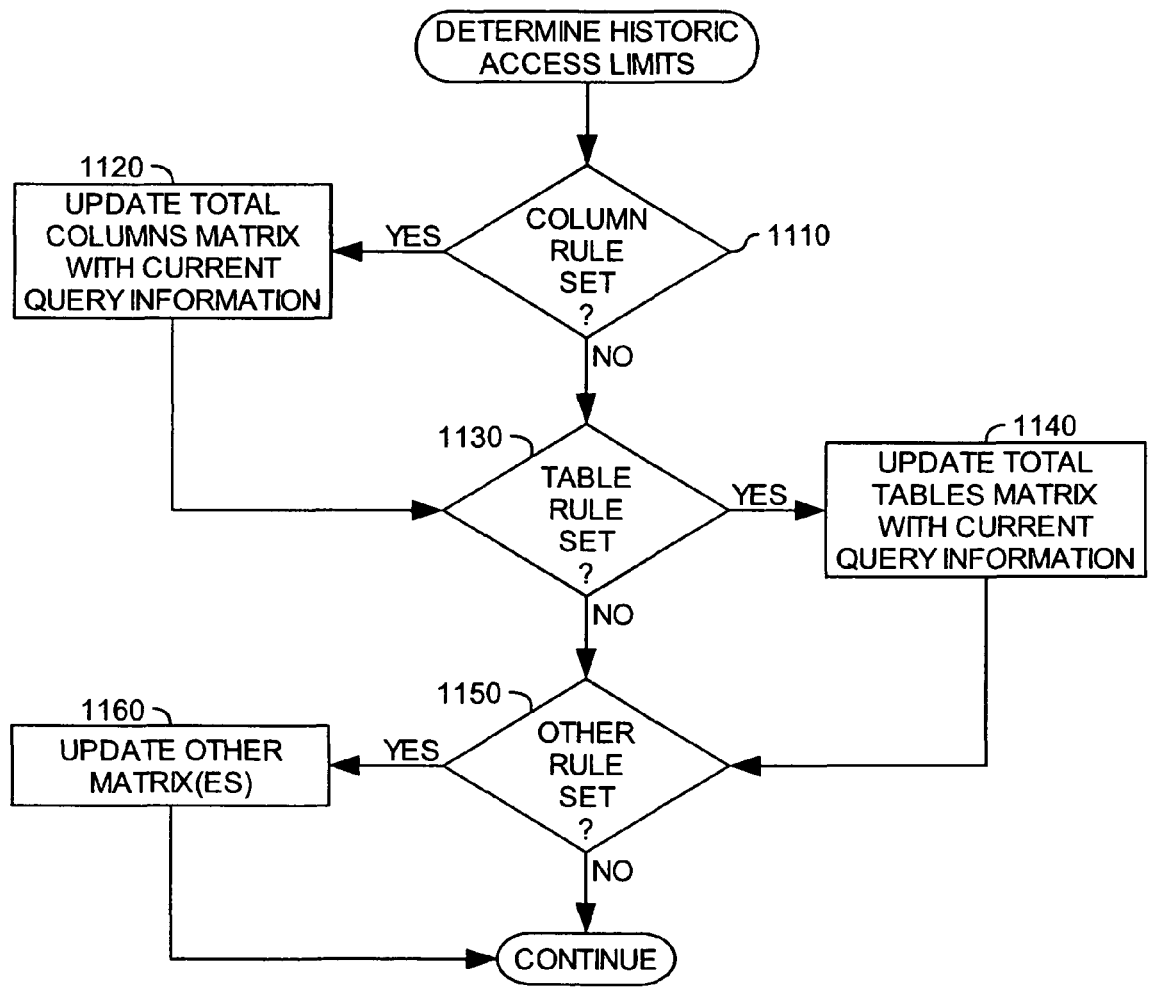
FIG. 11 is a flow chart illustrating a method of determining historical access limits in one embodiment.

Referring now to FIG. 11, an exemplary method 1100 for determination of historic access limits for a given user is illustrated. According to one aspect, method 1100 is entered from step 1040 of FIG. 10. At least a portion of the steps of method 1100 is performed using the output formatter 220 of FIG. 2.

Method 1100 starts at step 1110, where it is determined whether the historic access limits are required for application of a rule set which provides for column level access constraint. If so, a security object (e.g., security object 225 of FIG. 2) associated with the user is updated at step 1120, as described below. Otherwise, processing proceeds from step 1110 to step 1130.

At step 1120, the security object is updated to reflect all result fields included in the received abstract query. The security object is dynamically maintained to collectively reflect all fields referenced in the received abstract query as well as all fields referenced in previously received queries from the user. Accordingly, the security objects maintains a total columns matrix for the user, wherein all columns in underlying database tables which are accessed by queries of the user are tracked. Processing then continues at step 1130.

At step 1130, it is determined whether the historic access limits are required for application of a rule set which provides for table level access constraint. If so, the security object is updated at step 1140, as described below. Otherwise, processing proceeds from step 1130 to step 1150.

At step 1140, the security object is updated to reflect all database tables accessed by the received abstract query. The security object is dynamically maintained to collectively reflect all database tables referenced in the received abstract query as well as all database tables referenced in previously received queries from the user. Accordingly, the security objects maintains a total tables matrix for the user, wherein all database tables which are accessed by queries of the user are tracked. Processing then continues at step 1150.

However, it should be noted that the invention is not limited to historic access limits which are determined for any of the above described rule sets. Instead, any possible rule sets are broadly contemplated. Accordingly, if it is determined at step 1150 that the historic access limits are required for application of any other rule set, processing proceeds from step 1150 to step 1160. After performance of step 1160 or if it is determined at step 1150 that the historic access limits are not required for application of any other rule set, processing continues at step 1050 of the method 1000 of FIG. 10, as described above.

Step 1160 is representative of any other rule sets contemplated as embodiments of the present invention. However, it should be understood that embodiments are contemplated in which less than all the available rule sets are implemented. For example, in a particular embodiment only column based rule sets are used. Accordingly, all such implementations are broadly contemplated.

Figure 12:
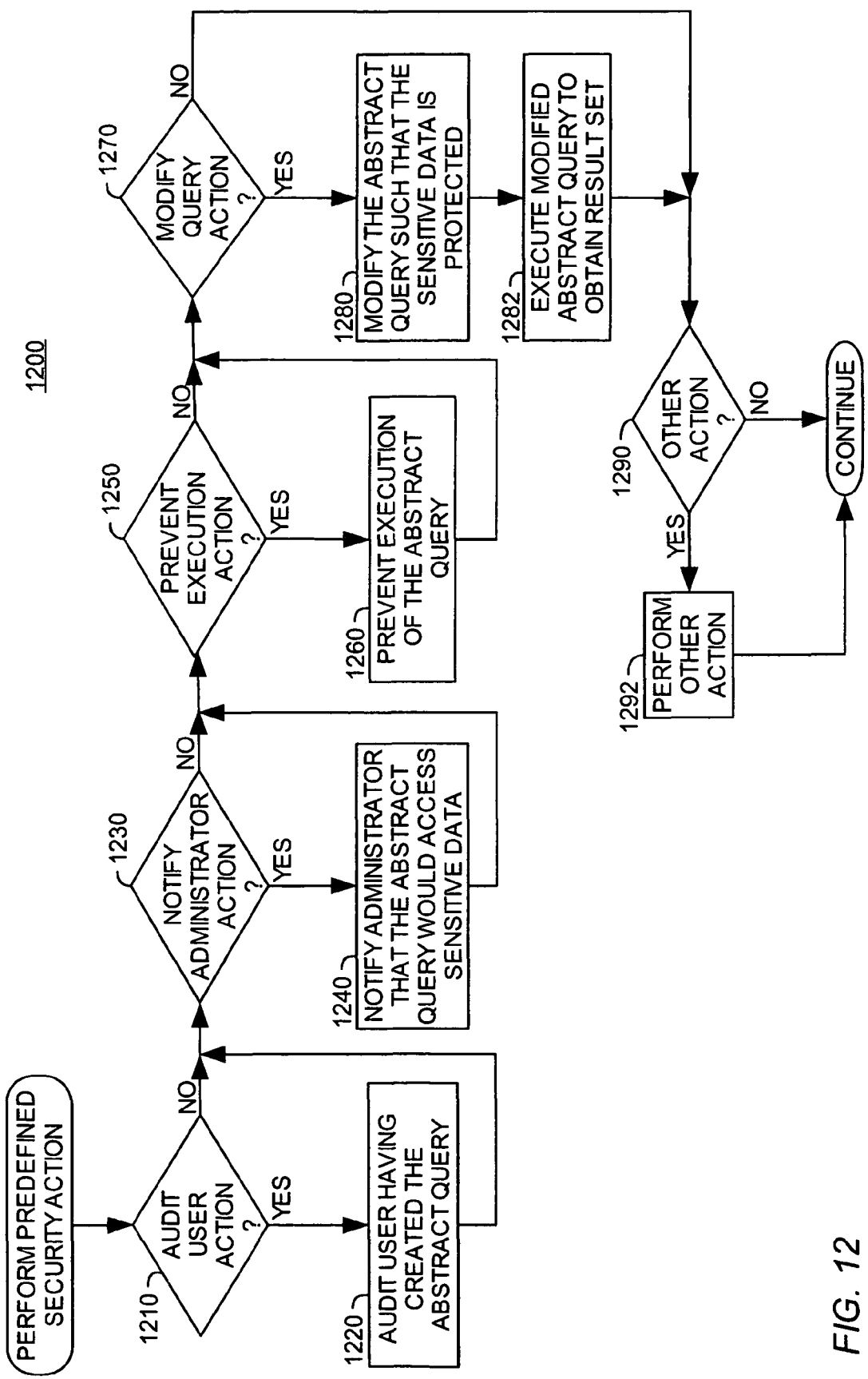
FIG. 12 is a flow chart illustrating a method of performing a predefined security action in another embodiment.

Referring now to FIG. 12, an exemplary method 1200 for performing a predefined security action (e.g., security action 224 of FIG. 2) with respect to a given abstract query (e.g., abstract query 260 of FIG. 2) accessing sensitive data is illustrated. According to one aspect, method 1200 is entered from step 1052 of FIG. 10. At least a portion of the steps of method 1200 is performed using the output formatter 220 of FIG. 2.

Method 1200 starts at step 1210, where it is determined whether the user having issued the given abstract query should be audited. If the user should not be audited, processing proceeds from step 1210 to step 1230. Otherwise, the user is audited at step 1220 and processing then continues at step 1230.

At step 1230, it is determined whether a corresponding administrator should be notified that the given abstract query would access the sensitive data. If the administrator should not be notified, processing proceeds from step 1230 to step 1250. Otherwise, the administrator is notified at step 1240 and processing then continues at step 1250.

At step 1250, it is determined whether execution of the given abstract query should be prevented. If query execution should not be prevented, processing proceeds from step 1250 to step 1270. Otherwise, execution of the given abstract query is prevented at step 1260 and processing then continues at step 1270.

At step 1270, it is determined whether the given abstract query should be modified such that a modified query is generated that does not access the sensitive data. If the given abstract query should not be modified, processing proceeds from step 1270 to step 1290. Otherwise, the given abstract query is modified at step 1280, whereby one or more result fields are removed from the given abstract query, in one embodiment. The modified query is then executed against the underlying database at step 1282 and processing then continues at step 1290.

However, it should be noted that the invention is not limited to any of the above described security actions. Instead, any possible security action is broadly contemplated. Accordingly, if it is determined at step 1290 that any other possible security action(s) should be performed, processing proceeds from step 1290 to step 1292. After performance of step 1292 or if it is determined at step 1290 that no other security action(s) should be performed, processing continues as described above with reference to FIG. 10.

Step 1292 is representative of any other security actions contemplated as embodiments of the present invention. However, it should be understood that embodiments are contemplated in which less than all the available security actions are implemented. For example, in a particular embodiment only administrator notification actions are used. In another embodiment, only user audit actions and administrator notification actions are used. Furthermore, it should be noted that embodiments are contemplated in which more than one security action is performed. For instance, the user may be audited before notification of the administrator and modification of the abstract query. Accordingly, all such implementations are broadly contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing access to sensitive data in a database, comprising:
 receiving, from a requesting entity, an abstract query having one or more result fields, each referencing a logical field of a data abstraction model abstractly describing data in a database, wherein the data abstraction model is configured to facilitate transforming the one or more result fields of the abstract query into a form consistent with a physical representation of the data in the database; and
 updating an object to reflect the one or more result fields in the abstract query, whereby the object is dynamically maintained to collectively reflect the fields referenced in the abstract query as well as the previously received queries from the requesting entity;

applying a security rule to the updated object, the security rule defining: (i) one or more unauthorized result field combinations for queries from the requesting entity and (ii) a corresponding security action selected from: (i) a first security action comprising auditing the requesting entity; (ii) a second security action comprising notifying an administrative entity; and (iii) a third security action comprising modifying query results to remove at least a portion of sensitive data from the query results, wherein the modified query results are output to the requesting entity; and upon determining, by operation of one or more computer processors, that the updated object contains a combination of fields that matches an unauthorized result field combination of the applied security rule, performing the corresponding security action by an application configured to selectively perform each of at least two different security actions selected from: (i) the first security action; (ii) the second security action; and (iii) the third security action.

2. The method of claim 1, wherein the application is further configured to selectively perform a fourth security action comprising:

removing at least one result field which relates to sensitive data from a received query, whereby a modified query is generated;

executing the modified query against the database to obtain a result set; and outputting the obtained result set to the requesting entity.

3. The method of claim 1, wherein the application is further configured to selectively perform a fourth security action comprising:

preventing execution of a received query against the database.

4. The method of claim 1, wherein applying the security rule to the updated object comprises at least one of:

(i) determining whether a received query includes a total number of result fields which does not exceed a predefined value; and (ii) determining whether the received query includes one or more unauthorized result field combinations.

5. The method of claim 1, wherein a sensitivity rating is determined for the query results, based on sensitivity attributes associated with data in the query results, wherein a predefined security action is performed with respect to the query results, based on the sensitivity rating, and wherein a predefined security action is performed with respect to the query results on the basis of the determined sensitivity rating.

6. The method of claim 5, wherein the third security action further comprises:

outputting the modified query results to a requesting entity.

7. The method of claim 5, wherein the sensitivity rating is determined by at least one of:

(i) determining a number of sensitive data elements in the query results;

(ii) determining a ratio describing a number of sensitive data elements in the query results versus a total number of elements in the query results; and (iii) determining a type of the sensitive data.

8. The method of claim 5, wherein the sensitivity rating is determined by:

(i) determining a number of sensitive data elements in the query results;

(ii) determining a ratio describing a number of sensitive data elements in the query results versus a total number of elements in the query results; and (iii) determining a type of the sensitive data.

9. A computer program product comprising:

a computer-readable storage medium having computer-readable program code embodied therewith to manage access to sensitive data in a database, the computer-readable program code comprising:

computer-readable program code configured to receive, from a requesting entity, an abstract query having one or more result fields, each referencing a logical field of a database abstraction model abstractly describing data in a database, wherein the data abstraction model is configured to facilitate transforming the one or more result fields of the abstract query into form consistent with a physical representation of the data in the database; and computer-readable program code configured to update an object to reflect the one or more result fields in the abstract query, whereby the object is dynamically maintained to collectively reflect the fields referenced in the abstract query as well as the previously received queries from the requesting entity;

computer-readable program code configured to apply a security rule to the updated object, the security rule defining: (i) one or more unauthorized result field combinations for queries from the requesting entity and (ii) a corresponding security action selected from: (i) a first security action comprising auditing the requesting entity; (ii) a second security action comprising notifying an administrative entity; and (iii) a third security action comprising modifying query results to remove at least a portion of sensitive data from the query results, wherein the modified query results are output to the requesting entity; and computer-readable program code configured to, upon determining, by operation of one or more computer processors when executing the computer-readable program code, that the updated object contains a combination of fields that matches an unauthorized result field combination of the applied security rule, perform the corresponding security action by an application configured to selectively perform each of at least two different security actions selected from: (i) the first security action; (ii) the second security action; and (iii) the third security action.

10. The computer program product of claim 9, wherein the application is further configured to selectively perform a fourth security action comprising:

removing at least one result field which relates to sensitive data from a received query, whereby a modified query is generated;

executing the modified query against the database to obtain a result set; and outputting the obtained result set to the requesting entity.

11. The computer program product of claim 9, wherein the application is further configured to selectively perform a fourth security action comprising:

preventing execution of a received query against the database.

12. The computer program product of claim 9, wherein applying the security rule to the updated object comprises at least one of:

(i) determining whether a received query includes a total number of result fields which does not exceed a predefined value; and (ii) determining whether the received query includes one or more unauthorized result field combinations.

13. A system comprising:

one or more computer processors;

a memory containing a program which, when executed by the one or more computer processors, performs an operation to manage access to sensitive data in a database, the operation comprising:

receiving, from a requesting entity an abstract query having one or more result fields, each referencing a logical field of a database abstraction model abstractly describing data in a database, wherein the data abstraction model is configured to facilitate transforming the one or more result fields of the abstract query into a form consistent with a physical representation of the data in the database; and updating an object to reflect the one or more result fields in the abstract query, whereby the object is dynamically maintained to collectively reflect the fields referenced in the abstract query as well as the previously received queries from the requesting entity;

applying a security rule to the updated object, the security rule defining: (i) one or more unauthorized result field combinations for queries from the requesting entity and (ii) a corresponding security action selected from: (i) a first security action comprising auditing the requesting entity; (ii) a second security action comprising notifying an administrative entity; and (iii) a third security action comprising modifying query results to remove at least a portion of sensitive data from the query results, wherein the modified query results are output to the requesting entity; and upon determining that the updated object contains a combination of fields that matches an unauthorized result field combination of the applied security rule, performing the corresponding security action by an application configured to selectively perform each of at least two different security actions selected from: (i) the first security action; (ii) the second security action; and (iii) the third security action.

14. The system of claim 13, wherein the application is further configured to selectively perform a fourth security action comprising:

removing at least one result field which relates to sensitive data from a received query, whereby a modified query is generated;

executing the modified query against the database to obtain a result set; and outputting the obtained result set to the requesting entity.

15. The system of claim 13, wherein the application is further configured to selectively perform a fourth security action comprising:

preventing execution of a received query against the database.

16. The system of claim 13, wherein applying the security rule to the updated object comprises at least one of:

(i) determining whether a received query includes a total number of result fields which does not exceed a predefined value; and (ii) determining whether the received query includes one or more unauthorized result field combinations.

* * * * *